(12) United States Patent
Wu

(10) Patent No.: US 11,079,772 B2
(45) Date of Patent: Aug. 3, 2021

(54) VEHICLE CONTROL METHOD AND CONTROL SYSTEM

(71) Applicant: Shenzhen Geniusmart Technologies Co., Ltd., Shenzhen (CN)

(72) Inventor: Jun Wu, Kowloon (HK)

(73) Assignee: Shenzhen Geniusmart Technologies Co., Ltd., Shenzhen (CN)

( * ) Notice: Subject to any disclaimer, the term of this patent is extended or adjusted under 35 U.S.C. 154(b) by 273 days.

(21) Appl. No.: 16/506,902

(22) Filed: Jul. 9, 2019

(65) Prior Publication Data

US 2020/0019187 A1   Jan. 16, 2020

(30) Foreign Application Priority Data

Jul. 10, 2018 (CN) .......................... 201810753119.4

(51) Int. Cl.
*G05D 1/02* (2020.01)
*H04W 4/44* (2018.01)
*G07C 5/00* (2006.01)

(52) U.S. Cl.
CPC ........... *G05D 1/0297* (2013.01); *G07C 5/008* (2013.01); *H04W 4/44* (2018.02); *G05D 2201/0213* (2013.01)

(58) Field of Classification Search
CPC ....... G05D 1/00–12; G05D 2201/0213; G05D 13/00; G05D 17/00; H04W 4/44; G07C 5/008; G01C 21/00–3896; B60L 15/20; B60L 2240/42; B60L 2240/421; B60L 2240/423

See application file for complete search history.

(56) References Cited

U.S. PATENT DOCUMENTS

| | | | |
|---|---|---|---|
| 2002/0040271 A1* | 4/2002 | Park | G08G 1/096861 701/468 |
| 2009/0001914 A1* | 1/2009 | Atarashi | B60L 50/61 318/437 |
| 2017/0068245 A1* | 3/2017 | Scofield | A61B 5/369 |
| 2019/0286151 A1* | 9/2019 | Palanisamy | G01C 21/3461 |

* cited by examiner

*Primary Examiner* — Aaron L Troost
(74) *Attorney, Agent, or Firm* — Andrew C. Cheng

(57) ABSTRACT

A vehicle control system for controlling multiple cloud-controlled vehicles includes a cloud side and a vehicle side. The cloud side includes a cloud server, a cloud drive controller and a cloud motor controller. The cloud-controlled vehicle side includes a vehicle-mounted communication terminal, a vehicle-mounted sub-controller and a vehicle-mounted motor controller. The vehicle-mounted sub-controller acquires basic parameters of a driver and the vehicle. The vehicle-mounted sub-controller performs vehicle driving settings. The vehicle-mounted communication terminal sends the vehicle driving settings to the cloud server. The cloud drive controller sends vehicle drive instructions to each vehicle. The vehicle-mounted sub-controller controls the vehicle to execute the vehicle drive instructions. The cloud motor controller computes a motor drive signal for each vehicle according to vehicle state information collected by the vehicle-mounted sub-controller and motor state information collected by the vehicle-mounted motor controller, the motor drive signal being used for driving a vehicle motor.

14 Claims, 6 Drawing Sheets

VEHICLE CONTROL METHOD AND CONTROL SYSTEM

CROSS REFERENCE TO RELATED APPLICATIONS

This non-provisional patent application claims priority under 35 U.S.C. § 119(a) from Patent. Application No. 201810753119.4 filed in The People's Republic of China on Jul. 10, 2018.

FIELD OF THE INVENTION

The present invention relates to control of vehicle driving and, in particular, to a vehicle control method and system with high precision and low control costs.

BACKGROUND OF THE INVENTION

Unmanned vehicles are intelligent vehicles that sense road environment through a vehicle-mounted sensing system, automatically plan driving route and control turning and speed of the vehicle according to the sensed and obtained road, map, vehicle position and obstacle information, and finally reach the preset target.

Since in unmanned driving, the car needs to collect a large amount of road condition, weather information, and information of a plurality of vehicles, and precisely control motor and driving system of the vehicle, driving trail, road, lane, speed, turning and obstacle avoidance, which requires controllers of the vehicle to acquire huge amount of information and perform intelligent analysis and computation rapidly, such that costs of controlling each vehicle are extremely high, which even may make it impossible to achieve the desired analysis and computation function.

SUMMARY OF THE INVENTION

In one aspect, a vehicle control method using a cloud is provided, which includes: acquiring basic parameters of a driver and a cloud-controlled vehicle; performing vehicle driving settings on a plurality of the cloud-controlled vehicles, wherein the vehicle driving settings include one or more settings of destination, high speed priority, shortest path, avoidance of congestion, vehicle speed and vehicle distance; sending the vehicle driving settings to a cloud server; sending a path planning instruction, a road selection instruction, a lane selection instruction, a vehicle speed instruction, a vehicle sequencing instruction, and a vehicle distance instruction through the cloud server to each vehicle according to the vehicle driving settings, a map system, weather information and road condition information; controlling each vehicle to display and execute the path planning instruction, the road selection instruction, the lane selection instruction, the vehicle speed instruction, the vehicle sequencing instruction, and the vehicle distance instruction received from the cloud; collecting vehicle state information in the process when the vehicle executes the instructions; collecting motor state information in the process when the vehicle executes the instructions; and computing in the cloud a motor drive signal for each vehicle according to the vehicle state information and the motor state information, the motor drive signal being used to drive the vehicle.

In one embodiment, the method includes computing instructions of turning, a turning radius, braking, honking, steering, lighting and braking lamp of the vehicle according to the vehicle state information, environment information and potential safety hazard information.

In one embodiment, the method includes sending an avoidance instruction to all vehicles according to the potential safety hazard information, wherein the avoidance instruction includes at least one of a speed reduction instruction, a turning instruction and a braking instruction.

In one embodiment, the method includes sending the basic parameters and the vehicle driving settings of the vehicle to the cloud server using high-speed wireless internet communication.

In one embodiment, computing in the cloud the motor drive signal comprises: computing the motor drive signal with motor vector control or direct torque control algorithms according to the vehicle state information and the motor state information; and controlling the vehicle to receive the motor drive signal, and driving a motor to rotate or brake according to the motor drive signal.

In one embodiment, the method includes: calculating, in the cloud, a motor torque given signal based on a difference between a speed given signal given by cloud computation and a motor speed feedback signal given by a motor sensor in the vehicle; performing, in the cloud, a vector control algorithm or a direct torque control algorithm on the motor torque given signal in combination with a feedback signal given by a device mounted in the vehicle to obtain a voltage given signal; performing, in the cloud, a Sinusoidal pulse width modulation conversion on the voltage given signal to obtain a voltage drive signal; sending the voltage drive signal to the vehicle; isolating and amplifying the voltage drive signal by a gate driver in the vehicle, the gate driver in turn outputting trigger signals to drive a power inverter to output an alternating variable-frequency voltage which drives a motor of the vehicle to rotate.

In one embodiment, the method includes: calculating, in the cloud, a motor torque given signal based on a difference between a speed given signal given by cloud computation and a motor speed feedback signal given by a motor sensor in the vehicle; performing, in the cloud, a vector control algorithm or a direct torque control algorithm on the motor torque given signal in combination with a feedback signal given by a device mounted in the vehicle to obtain a voltage given signal; sending the voltage given signal to the vehicle; performing, in the vehicle, a Sinusoidal pulse width modulation conversion on the voltage given signal to obtain a voltage drive signal; isolating and amplifying the voltage drive signal by a gate driver in the vehicle, the gate driver in turn outputting trigger signals to drive a power inverter to output an alternating variable-frequency voltage which drives a motor of the vehicle to rotate.

In one embodiment, the method includes: calculating, in the cloud, a given driving current based on a difference between a given speed given by cloud computation and a motor speed feedback given by a motor sensor in the vehicle; inputting a difference between the given diving current and a motor feedback direct current to a trigger angle and pulse width modulation module which computes to output a given trigger angle and a given pulse width, the trigger angle and pulse width modulation module being located in the cloud; sending the given trigger angle, the given pulse width to the vehicle; performing, in the vehicle, a cyclic coding and PWM computation on the given trigger angle, the given pulse width and pulse feedback signals of rotor magnetic pole positions to output a voltage drive signal; and isolating and amplifying the voltage drive signal by a gate driver in the vehicle, the gate driver in turn outputting trigger signals to drive a power inverter to output an alternating variable-frequency voltage which drives a motor of the vehicle to rotate.

In another aspect, a vehicle control system is provided for controlling a plurality of cloud-controlled vehicles. The vehicle control system includes a cloud side and a cloud-controlled vehicle side; the cloud side including a cloud server, and a cloud drive controller and a cloud motor controller in communication with the cloud server; the cloud-controlled vehicle side including a vehicle-mounted communication terminal, and a vehicle-mounted sub-controller and a vehicle-mounted motor controller in communication with the vehicle-mounted communication terminal; the vehicle-mounted communication terminal being in communication with the cloud server. The vehicle-mounted sub-controller may be configured to acquire basic parameters of a driver and the vehicle. The vehicle-mounted sub-controller may be configured to perform vehicle driving settings, wherein the vehicle driving settings include settings of destination, high speed priority, shortest path, avoidance of congestion, vehicle speed and vehicle distance. The vehicle-mounted communication terminal may be configured to send the vehicle driving settings to the cloud server. The cloud drive controller may be configured to send, through the cloud server, at least one of a path planning instruction, a road selection instruction, a lane selection instruction, a vehicle speed instruction, a vehicle sequencing instruction, and a vehicle distance instruction to each vehicle according to the vehicle driving settings, a map and vehicle positioning system, weather information and road condition information. The vehicle-mounted sub-controller may be configured to display and control the vehicle to execute the path planning instruction, the road selection instruction, the lane selection instruction, the vehicle speed instruction, and the vehicle distance instruction. The vehicle-mounted sub-controller may be configured to collect vehicle state information in the process when the vehicle executes the instructions. The vehicle-mounted motor controller may be configured to collect motor state information in the process when the vehicle executes the instructions. The cloud motor controller may be configured to compute a motor drive signal for each vehicle according to the vehicle state information and the motor state information, the motor drive signal being used for driving a vehicle motor.

In one embodiment, the cloud drive controller is configured to compute instructions of turning, a turning radius, braking, honking, steering, lighting and brake lamp of the vehicle according to the vehicle state information, environment information and potential safety hazard information.

In one embodiment, the cloud drive controller is configured to send an avoidance instruction to one corresponding vehicle according to the potential safety hazard information, wherein the avoidance instruction includes at least one of a speed reduction instruction, a turning instruction and a braking instruction.

In one embodiment, the cloud server is connected to the vehicle-mounted communication terminal through a high-speed wireless internet communication.

In one embodiment, the cloud motor controller is configured to compute the motor drive signal with motor vector control algorithm or direct torque control algorithm according to the vehicle state information and the motor state information, and send the motor drive signal to the vehicle-mounted communication terminal through the cloud server; and the vehicle-mounted motor controller is configured to receive the motor drive signal from the vehicle-mounted communication terminal, and drive the vehicle motor to rotate or brake according to the motor drive signal.

In still another aspect, a vehicle control method is provided, which is configured to be performed in one of a plurality of cloud-controlled vehicles. The method includes: acquiring basic parameters of the one vehicle and a driver associated with the one vehicle; acquiring vehicle driving settings associated with the one vehicle, wherein the vehicle driving settings include at least one of settings of destination, high speed priority, shortest path, avoidance of congestion, vehicle speed and vehicle distance; sending the vehicle driving settings to a cloud server in a cloud; receiving a vehicle control instruction for the one vehicle from the cloud server, the vehicle control instruction being an instruction that is calculated in the cloud according to the vehicle driving settings and other cloud data, the vehicle control instruction including at least one of a path planning instruction, a road selection instruction, a lane selection instruction, a vehicle speed instruction, a vehicle sequencing instruction, and a vehicle distance instruction, the other cloud data including at least one of map system data, weather information and road condition information; controlling the one vehicle to display and execute the vehicle control instruction; collecting vehicle state information in the process when the one vehicle executes the vehicle control instruction, and sending the vehicle state information to the cloud server; collecting motor state information in the process when the one vehicle executes the vehicle control instruction, and sending the motor state information to the cloud server; receiving a motor drive signal for the one vehicle from the cloud server, the motor drive signal being a signal that is calculated in the cloud according to the vehicle state information and the motor state information; and driving the vehicle using the motor drive signal.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
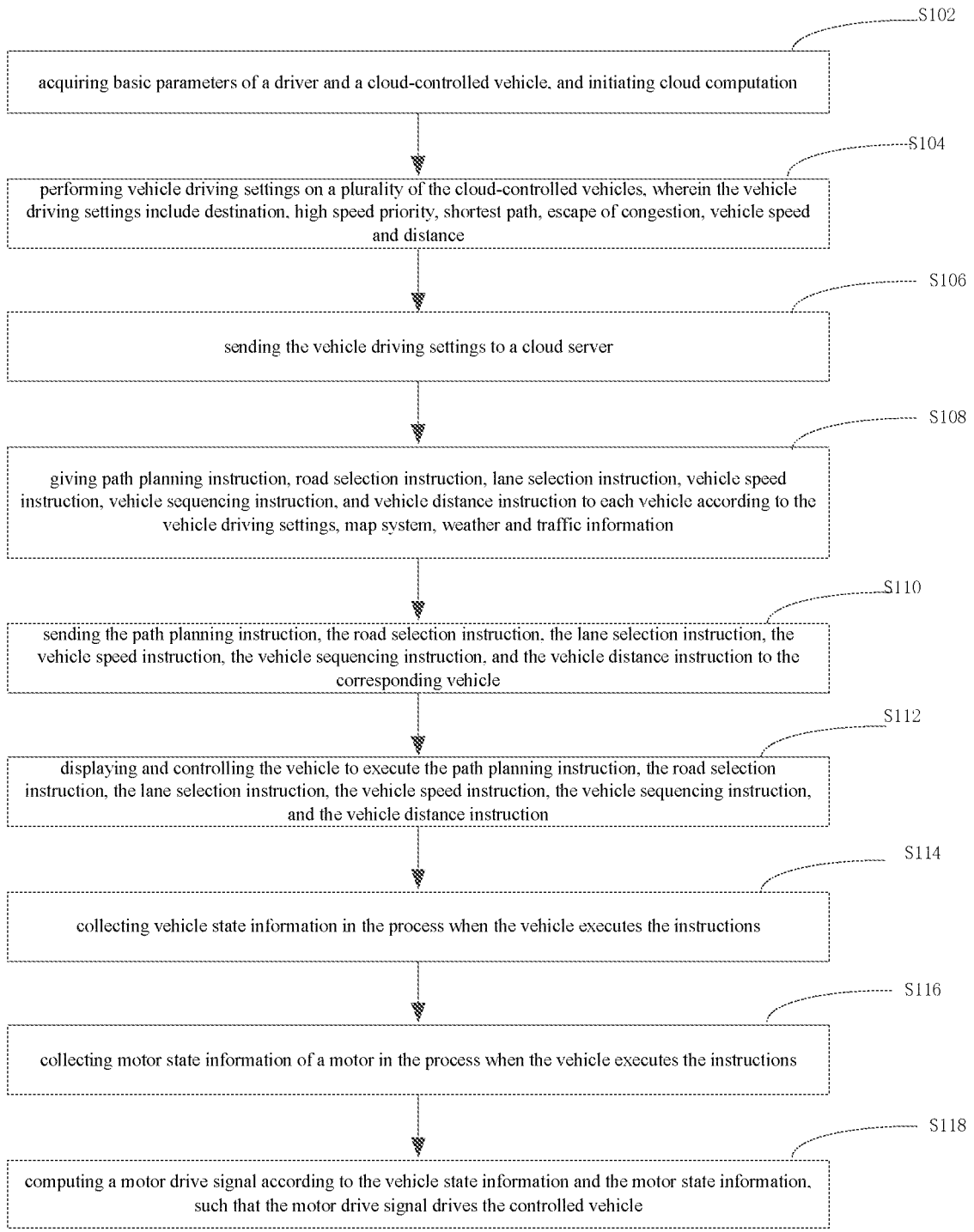
FIG. 1 is a flow chart of a vehicle control method.

FIG. 1 is a flow chart of a vehicle control method. The vehicle control method includes the following steps.

At Step S102, basic parameters of a driver and a cloud-controlled vehicle are acquired, and cloud computation is initiated. The driver is associated with the cloud-controlled vehicle.

Before the step of driving, a vehicle terminal needs to read basic parameters of the driver and the vehicle, such as, age and driving license class of the driver, vehicle model, mileage, the remaining amount of oil, etc. of the vehicle. After the above parameters are collected, they are sent to a cloud server. After the cloud server judges that these basic parameters are correct, the cloud server initiates a cloud computation, i.e. the vehicle has entered into the cloud control.

At Step S104, vehicle driving settings are performed on a plurality of the cloud-controlled vehicles, wherein the vehicle driving settings include settings of destination, high speed priority, shortest path, escape of congestion, vehicle speed and/or vehicle distance from a front vehicle (hereinafter referred to as "vehicle distance").

The vehicle is further provided with various sensors or data collecting devices, such as, human-machine interface (HMI), video, laser, acoustics, voltage, current, acceleration, and/or rotor position sensors. The vehicle driving settings, driving states and road environment information are collected by the above sensors.

At Step S106, the vehicle driving settings are sent to the cloud server. The vehicle driving settings can be sent to the cloud server via a wireless high-speed internet.

At Step S108, path planning instruction, road selection instruction, lane selection instruction, vehicle speed instruction, vehicle sequencing instruction, and vehicle distance instruction are provided to each vehicle according to the vehicle driving settings, map and vehicle positioning system information, weather and road condition information.

The cloud server can generate the path planning instruction, road selection instruction, lane selection instruction, vehicle speed instruction, and vehicle distance instruction according to the vehicle driving settings in combination with cloud big data, such as, the map and vehicle positioning system information, weather information, road condition information, etc.

At Step S110, The path planning instruction, the road selection instruction, the lane selection instruction, the vehicle speed instruction, the vehicle distance instruction, and the vehicle sequencing instruction are transmitted to the corresponding vehicles. Specifically, the cloud server can perform data interaction with the vehicles via a wireless high-speed Internet.

At Step S112, the path planning instruction, the road selection instruction, the lane selection instruction, the vehicle speed instruction, the vehicle sequencing instruction, and the vehicle distance instruction are displayed in the vehicle and the vehicle is controlled to execute these instructions. The corresponding vehicle receives the control instructions from the cloud server, and displays and drives based on the control instructions.

At Step S114, vehicle state information in the process when the vehicle executes the instructions is collected.

At Step S116, motor state information of a motor the process when the vehicle executes the instructions is collected.

At Step S118, a motor drive signal is computed according to the vehicle state information and the motor state information, such that the motor drives the vehicle according to the motor drive signal.

In one embodiment, the step S118 includes:

computing the motor drive signal using motor vector control algorithm or direct torque control algorithm according to the vehicle state information and the motor state information; and receiving the motor drive signal by the vehicle, and driving the motor to rotate or brake according to the motor drive signal.

The vehicle control method further includes computing instructions of, e.g. turning, turning radius, braking, honking, steering, lighting and brake lamp of the vehicle according to the vehicle state information, environment information and potential safety hazard information.

The vehicle control method further includes: sending an avoidance instruction to each associated vehicle according to the potential safety hazard information, wherein the avoidance instruction includes at least one of a speed reduction instruction, a turning instruction and a braking instruction.

The vehicle control method further includes sending the basic parameters and the vehicle driving settings of the vehicle to the cloud server using high-speed wireless internet communication.

Based on the control methods of all embodiments above, the cloud server is connected to a plurality of the vehicles via a high-speed wireless internet (Real-time Ethernet), and receives the vehicle driving settings, vehicle information, road condition and environment information sent from each of the vehicles and its sub-systems, wherein the vehicle information includes vehicle condition (position, speed and lane) information, motor state information and battery use condition information.

In the above vehicle control method, vehicle information collected by vehicle-mounted sub-controllers is transmitted to a cloud motor controller through the cloud server and the vehicle-mounted communication terminal. By virtue of powerful storage capability, computing capability, big data acquisition capability, rapid communication capability and cheap usage fee of the cloud, it makes it possible to rapidly, precisely, intelligently and perfectly complete tasks which would not be possible to be completed by a single vehicle-mounted controller. Each vehicle only needs one vehicle-mounted communication terminal and a plurality of simple sub-controllers, and complicated computation and process of motor control are moved to the cloud motor controller for execution, which greatly simplify and reduce computing requirements of the controller in the vehicle, thereby comprehensively utilizing social resources and hence reducing costs of the vehicle system. The cloud server can further achieve artificial intelligence coordinated schedule and control of multiple vehicles, such that the cloud-controlled vehicles can be predictively, preventively and orderly operated, and follow their respective lanes, avoid overtaking, coordinatedly slow down and give way, and quickly drive one after another, which can significantly reduce accident rates, and improve traffic efficiency and safety.

Figure 2:
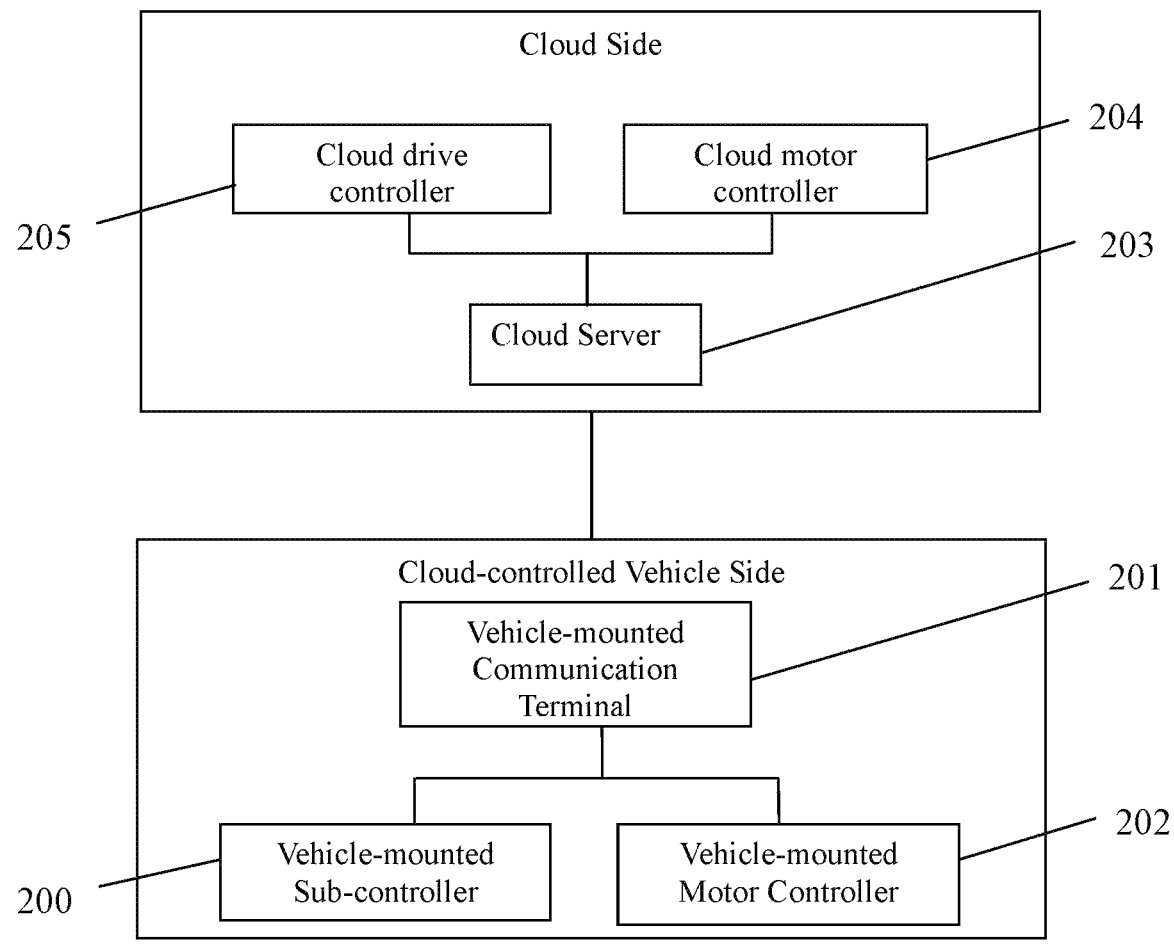
FIG. 2 is a block diagram of a vehicle control system.

FIG. 2 is a block diagram of a vehicle control system according to one embodiment of the present invention. The vehicle control system includes a cloud-side and a cloud-controlled vehicle side. The cloud side includes a cloud server 230, and a cloud drive controller 205 and a cloud motor controller 204 in communication with the cloud server 203. The cloud-controlled vehicle side includes a vehicle-mounted communication terminal 201, and a vehicle-mounted sub-controller 200 and a vehicle-mounted motor controller 202 in communication with the vehicle-mounted communication terminal 201.

The vehicle-mounted sub-controller 200 is configured to acquire basic parameters of a driver and the vehicle to perform vehicle driving settings, and send the vehicle driving settings to the cloud side through the vehicle-mounted communication terminal 201, wherein the vehicle driving settings include settings of destination, high speed priority, shortest path, avoiding congestion, vehicle speed, vehicle distance and the like. The vehicle-mounted sub-controller 200 further receives data or instructions from the cloud side through the vehicle-mounted communication terminal 201, collects vehicle state information in the process when the vehicle executes the instructions, and sends the vehicle state information to the cloud for storage and computation through the vehicle-mounted communication terminal 201. In this embodiment, the vehicle-mounted sub-controller 200 is configured to receive and collect driving setting information of the driver, data flow demand information, vehicle state information, and road condition and environment information detected by the vehicle, which are read and sent to the cloud side through the vehicle-mounted communication terminal 201.

The vehicle-mounted motor controller 202 is configured to collect motor state information of the vehicle motor in the process when the vehicle executes the instructions, and send the motor state information to the cloud side for storage and computation through the vehicle-mounted communication terminal 201.

The vehicle-mounted communication terminal 201 is configured to send data collected by the vehicle-mounted sub-controller 200 and the vehicle-mounted motor controller 202 to the cloud server 203, and the cloud server 203 sends the above data (i.e. the vehicle state information and the motor state information) to the cloud drive controller 205 and the cloud motor controller 204 for storage and computation. The cloud-controlled vehicle side also receives data or instructions from the cloud side through the vehicle-mounted communication terminal 201. In this embodiment, the vehicle-mounted communication terminal 201 and the cloud server 203 are communicated via a high-speed wireless internet.

The cloud drive controller 205 is configured to send a path planning instruction, road selection instruction, lane selection instruction, vehicle speed instruction, vehicle sequencing instruction, and vehicle distance instruction to each vehicle according to the vehicle driving settings, map and vehicle positioning system information, weather information and road condition information. These instructions are sent to the vehicle-mounted communication terminal 201 of each vehicle through the cloud server 205, and then sent to the corresponding vehicle-mounted sub-controller 200 through the vehicle-mounted communication terminal 201 to control the vehicle to display and/or execute.

The cloud motor controller 204 is configured to compute the motor drive signal for driving the vehicle motor according to the vehicle state information and the motor state information. The motor drive signal is sent to the vehicle-mounted communication terminal 201 of each vehicle through the cloud server 203, and then sent to the corresponding vehicle-mounted motor controller 202 through the vehicle-mounted communication terminal 201 to control operation of the vehicle motor.

Specifically, the vehicle-mounted motor controller 202 (including vector transformation, BLDC control, direct torque control, position sensor, or not including position sensor) sends position information of a rotor of the motor to the cloud motor controller 204 through the vehicle-mounted communication terminal 201 and the cloud server 203, and the cloud motor controller 204 simultaneously computes and generates a motor control command according to the motor state information and the battery use condition information sent by the vehicle-mounted motor controller 202, thereby controlling motor operation and driving state of the vehicle in real time. The vehicle-mounted motor controller 202 includes a motor rotor position sensor and a battery detection sensor. The motor rotor position sensor sends motor rotor positional information of the vehicle to the cloud motor controller 204 through the vehicle-mounted communication terminal 201. The cloud motor controller 204 simultaneously computes and generates the motor control command according to drive instruction information and the battery use condition information sent by the cloud drive controller 205, thereby controlling driving state of the vehicle in real time.

The cloud drive controller 205 is configured to receive various vehicle information, and compute and generate driving control commands and data flow of each vehicle according to vehicle information, weather information, road condition, road regulations and safety condition information prestored in the cloud drive controller 205, wherein the control commands include the above path instruction, road instruction, lane selection instruction, vehicle acceleration and deceleration instructions, turning instruction, honking instruction, indicator light instruction, braking instruction and vehicle-mounted motor speed instruction, and the data flow includes videos, audios, images and webpages. Specifically, the cloud drive controller 205 computes the instructions of turning, turning radius, braking, honking, steering, lighting and braking lamp of the vehicle according to the vehicle state information, environment information and potential safety hazard information, and sends an avoidance instruction to all associated vehicles according to the potential safety hazard information, wherein the avoidance instruction includes at least one of a speed reduction instruction, a turning instruction and a braking instruction.

The cloud server 203 is configured to send the control commands and the data flow to the vehicle-mounted communication terminal 201 and the vehicle-mounted communication terminal 201 sends the control commands and the data flow to the vehicle-mounted sub-controller 200 and the vehicle-mounted motor controller 202 for controlling and/or displaying.

In some embodiments, the cloud server 203, the cloud drive controller 205 and the cloud motor controller 204 are connected to a plurality of vehicle-mounted communication terminals 201 via a high-speed wireless internet, and concurrently perform data interaction of the above described vehicle information with the plurality of vehicle-mounted communication terminals 201, wherein the vehicle information includes one or more of a passenger's identity, driving instructions, vehicle positions, driving conditions, road environments, potential safety hazards, battery conditions and motor conditions.

Figure 3:
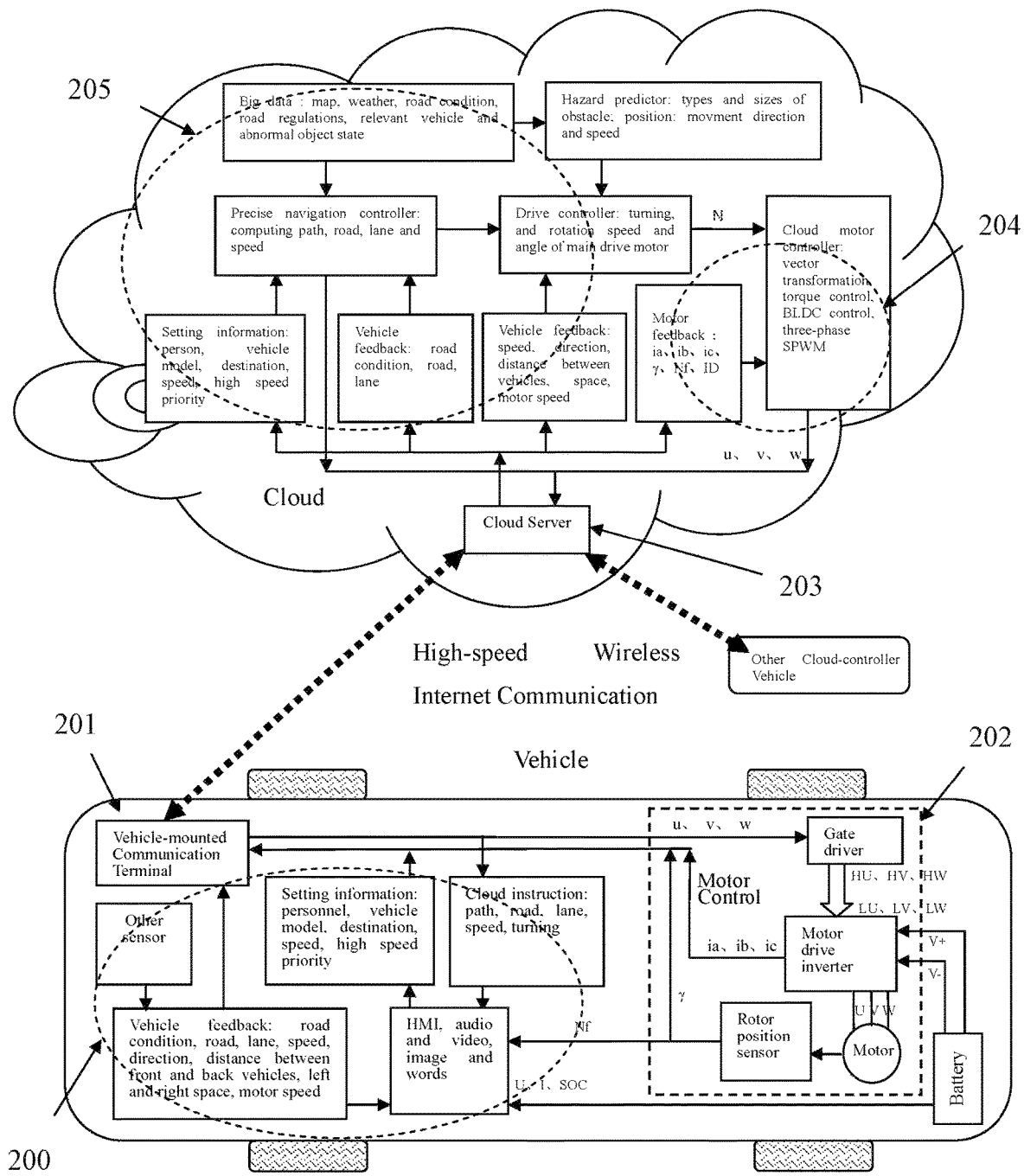
FIG. 3 is a block diagram of the vehicle control system.
Figure 4A:
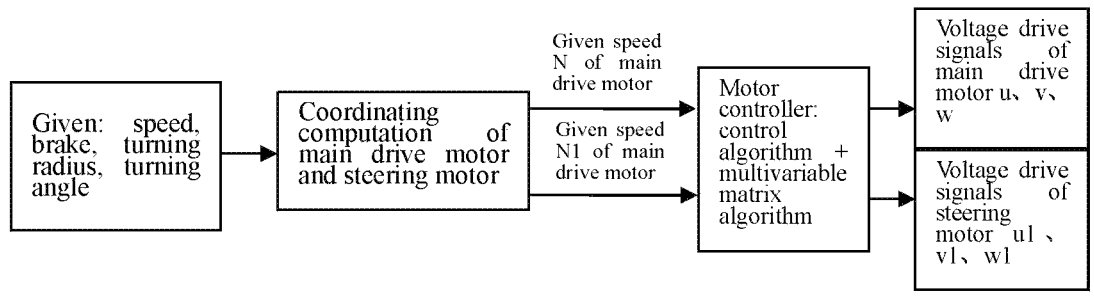
FIG. 4a is a flow chart of cloud drive control and motor control.
Figure 4B:
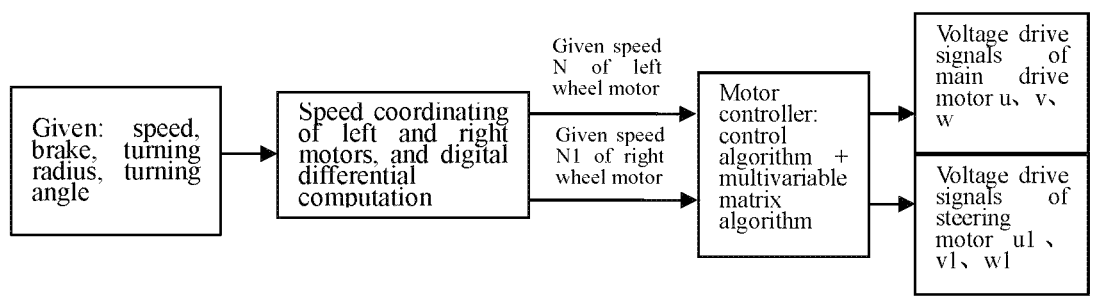
FIG. 4b is a flow chart of cloud drive control and motor control.
Figure 4C:
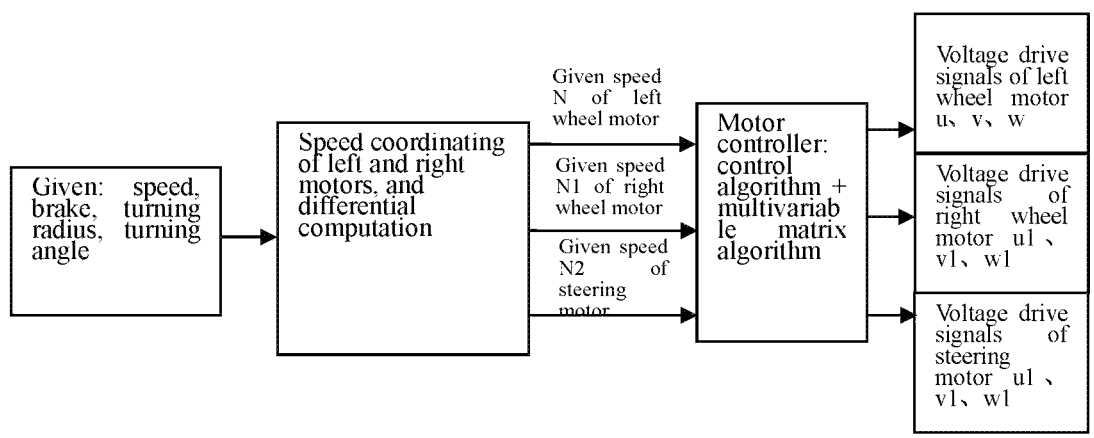
FIG. 4c is a flow chart of cloud drive control and motor control.
Figure 4D:
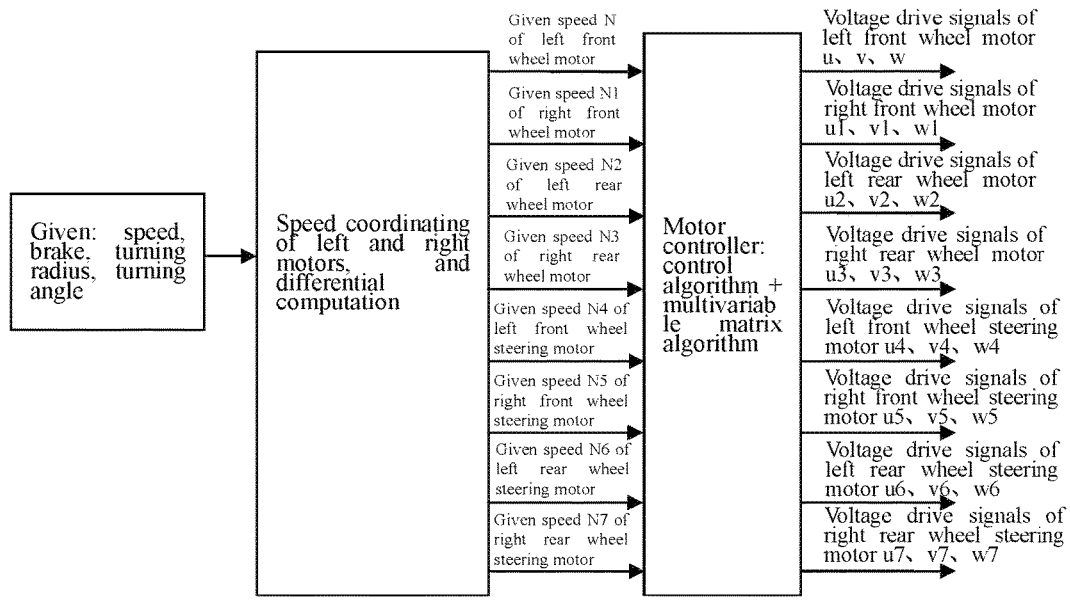
FIG. 4d is a flow chart of cloud drive control and motor control.

Details of some embodiments of the vehicle control system are further discussed below with reference to FIG. 2 and FIG. 3.

The cloud server 203 acquires the vehicle information of each associated vehicle, sends it to relevant sub-modules, and plans and sends path, road, lane and vehicle speed instructions to each associated vehicle for display. At the same time, the cloud server 203 provides a given speed N of each vehicle-mounted motor, and the cloud motor controller 204 calculates motor drive voltage signals based on the vehicle-mounted motor given speed N in combination with motor feedback signals including alternating currents ia, ib, ic, rotor position angle γ, speed feedback Nf, or direct current feedback ID. The calculated motor drive voltage signals are transmitted through the cloud server 203 to the associated vehicle-mounted communication terminal 201 and the vehicle-mounted motor controller 202 to drive the motor to operate.

The vehicle-mounted communication terminal 201 sends setting information of respective vehicle-mounted sub-modules and detected information of respective sensors to the cloud server 203. The cloud drive controller or cloud sub-controller 205 computes to plan information, such as, path, road, lane, etc., which are sent to the HMI for display. The cloud motor controller 204 computes motor voltage drive signals which are sent to the vehicle-mounted motor controller 202 to drive the motor to operate. The vehicle-mounted motor controller 202 collects and uploads the motor information, the battery information and the like for computation use by the cloud motor controller 204.

The vehicle-mounted human-computer interface is configured to set and display various desired information, audios, videos, graphs, texts and the like, and the dotted arrows in the figures denote high-speed wireless internet communication paths.

The vehicle-mounted motor controller 202 is a motor vehicle-mounted algorithm control module, with u, v and w denoting motor drive voltage signals, HU, with HV and HW denoting trigger signals of an upper bridge switch device of a three-phase inverter, LU, LV and LW denoting trigger signals of a lower bridge switch device of the three-phase inverter, and with U, I and SOC denoting battery voltage, current and remaining power capacity signals. Symbols ia, ib, ic, γ and Nf denote a three-phase current of the motor, a position angle of rotor magnetic poles and a rotor speed, respectively. Here, there are a plurality of the people, the vehicles and the motors (the motors may be asynchronous motors, permanent magnet synchronous motors, BLDC motors, reluctance motors, stepping motors and DC motors), and the algorithm includes all motor control algorithms, artificial intelligence algorithms and multivariable matrix algorithms.

In this embodiment, the personal information includes driver identity information, driving license information, information as to whether the driver is the owner of the vehicle, third party authorization information (vehicle owner authorization, vehicle operator authorization), and the like. Vehicle information includes vehicle license information (vehicle model, scrappage VKT (vehicle kilometers traveled) limit), vehicle condition/speed history information, and the like.

The HMI is configured to receive manual setting information (which may be inputted through key input, handwriting and voice input), display various information (navigation trail, road, lane, distance between vehicles, driving distance, remaining distance, road condition alarm, etc.) (the battery state, such as, voltage, current, remaining capacity, failure alarm) (the driving state, such as, speed, turning, braking, vehicle lamp, etc.) (the motor state, such as, motor speed, current, torque, temperature, failure alarm), connect to respective vehicle-mounted sub-controllers and sensors using Bluetooth/wifi/wired network to acquire vehicle, motor and environmental condition information, and exchange data with the cloud via the high-speed wireless internet.

The sensors include a motor rotor position sensor (such as, magnetic encoder, optical encoder, rotary transformer, Hall element and/or a method of recognizing the rotor position using software), voltage/current/energy sensors, environmental sensors (temperature inside and outside the vehicle, brightness, rain/snow/visibility, noise and vibration, acceleration, speed, camera, radar, laser, ultrasonic wave), and the like.

The vehicle-mounted sub-controller 200 includes a HMI, sensors, motor controllers. Other simple control for, such as, door locks, seats, windows, the air conditioner, battery monitoring, etc. is still performed at the vehicle side, which is irrelevant to cloud computation and therefore not discussed herein in more detail.

The cloud server 203 is configured for communication with a plurality of the cloud-controlled vehicles, and initiation and management of the cloud sub-controller.

The cloud sub-controller includes the cloud drive controller 205 (which computes the given path, road, lane, vehicle speed, turning, turning radius, distance between front and back vehicles, left and right space, potential safety hazard, etc.) and the cloud motor controller 204 (computing a variable-frequency drive voltage instruction of the three-phase motor according to the motor speed instruction and feedback parameters through a control algorithm, such as, the motor vector transformation).

Control of potential safety hazard can be made by comprehensively analyzing location of potential safety hazard, characteristics of human or objects, and movement direction and speed according to environment feedback information, road camera information and cloud big data information associated with all relevant vehicles, thereby instructing all relevant vehicles to collaboratively slow down, brake, honk, and avoid risks. In case any vehicle changes lane, because the instructions are sent from the cloud, all relevant vehicles can be intelligently controlled to collaboratively slow down and leave a suitable space for changing lane to avoid collision accidents.

When the vehicle power supply gives a low-battery alarm, the vehicle will automatically change the navigation target to the nearest or least-busy battery charging/swapping station to charge/swap the battery.

The vehicle motor control system further includes various motor control methods, such as motor vector control variable-frequency speed regulation, or BLDC motor speed regulation methods.

FIG. 4a through FIG. 4d illustrate the control of a plurality of motors provided in a single vehicle. Alternatively, there may be other implementations. For example, two wheel motors drive two-wheel steering, two wheel motors drive four-wheel steering, multiple wheel motors drive multi-wheel steering, and the like. There implementations are not discussed herein in greater detail. All these computations can be modularly called in the cloud, so it is convenient for implementation.

The vehicle motor control system further includes a vehicle control method combining the cloud side and the vehicle side.

Figure 5:
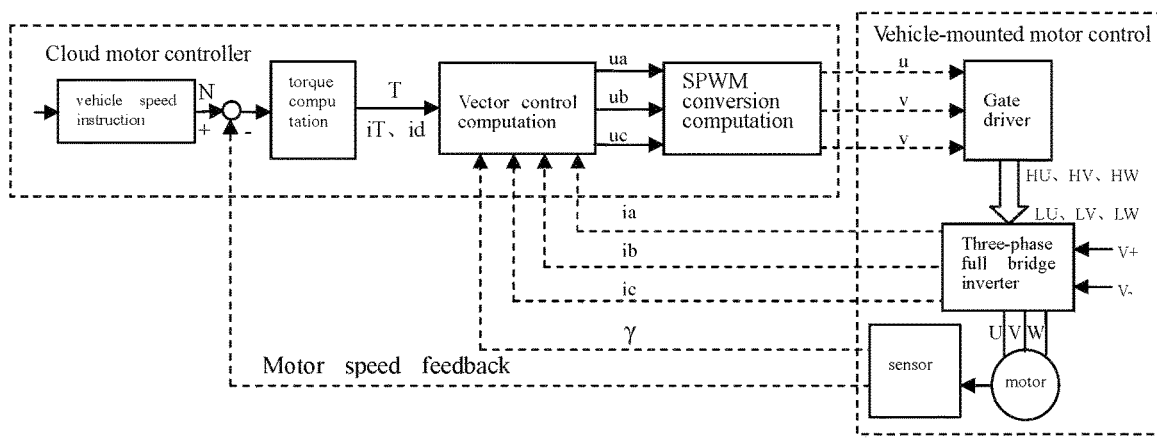
FIG. 5 is a block diagram of motor speed control cooperatively performed by the cloud and vehicle

Refer to FIG. 5, the dotted-box portion of the cloud computation represents a motor speed regulation control algorithm, and the dotted box portion of the vehicle-mounted control represents the power control part on the vehicle side, which achieves reasonable division of control at the cloud side and the vehicle side. The dotted arrows represent wireless data transmission paths between the vehicle-mounted terminal and the cloud server over the high-speed wireless interne. A motor torque given signal (which may be a torque T, a torque current iT, or a direct/quadrature axis current id/iq) is calculated by a torque calculation module based on a difference between a speed given signal N given by cloud computation and a motor speed feedback signal Nf given by the motor sensor (e.g. an encoder, a rotational transformer, a Hall element, a speed sensor, etc.). A vector control computation (which may be replaced by direct torque control algorithms for BLDC motor, which are not discussed herein in detail because they are common algorithms in the art) is performed on the motor torque given signal in combination with the feedback signals (three-phrase motor currents ia, ib and ic, and an angle γ between the rotor position and a-axis of three-phase fixed coordinates) given by the vehicle-mounted device to obtain voltage given signals ua, ub and uc in the motor fixed coordinates. A three-phase Sinusoidal Pulse Width Modulation (SPWM) conversion is performed on the voltage given signals ua, ub and uc to obtain three-phase SPWM voltage drive signals u, v and w, which are sent to the vehicle side. The three-phase SPWM voltage drive signals u, v and w are isolated and amplified by a gate driver, which in turn outputs upper bridge trigger signals HU, HV and HW and lower bridge trigger signals LU, LV and LW to drive a three-phase full bridge power inverter to output a three-phase alternating variable-frequency voltage which drives the motor to rotate. Alternatively, a two-phase or multi-phase alternating variable-frequency voltage may be used to drive the motor with a corresponding number of phases to rotate.

Figure 6:
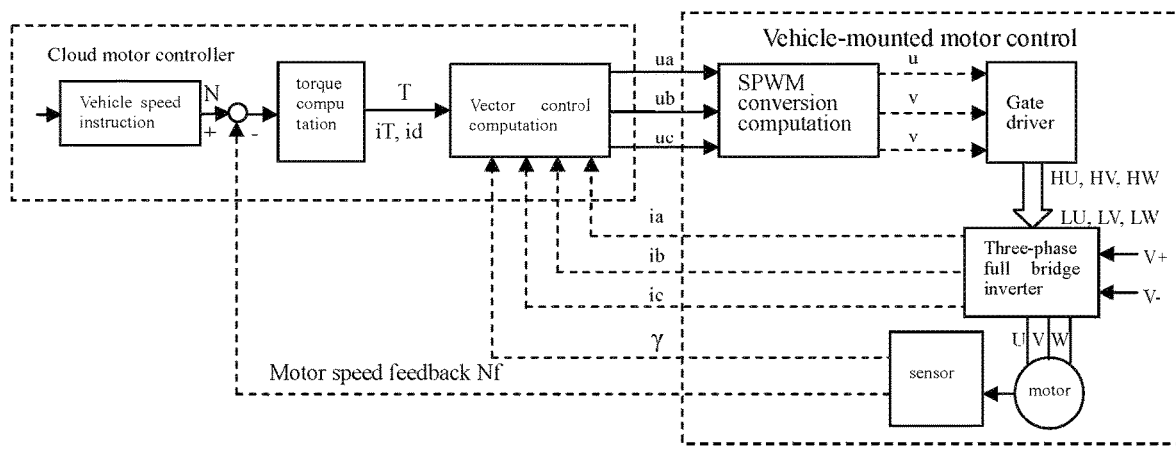
FIG. 6 is a block diagram of motor speed control cooperatively performed by the cloud terminal and vehicle.

Referring also to FIG. 6, data computation that needs to be done superfast, such as, SPWM conversion, can also be moved to and performed at the vehicle side, which may significantly reduce the volume of data communication between the cloud side and the vehicle side, and facilitates precise real-time motor control. Alternatively, the functional modules of the cloud and the vehicle can be divided in another suitable manner. The dotted box portion of cloud computation represents a cloud computation part of the motor speed regulation control algorithm, and the dotted box portion of vehicle-mounted control represents hardware parts of the motor speed regulation control algorithm module and power control, motor and sensors. Here, the dotted arrows denote wireless data transmission paths between the vehicle-mounted terminal and the cloud server over the high-speed wireless internet.

Figure 7:
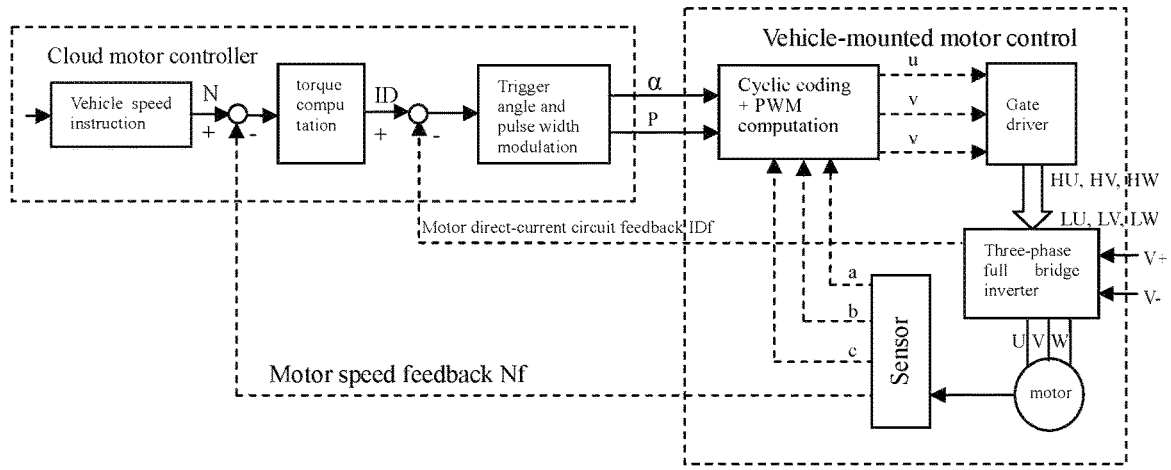
FIG. 7 is a block diagram of BLDC motor control cooperatively performed by the cloud and vehicle.

Referring to FIG. 7, the dotted box portion of the cloud motor controller represents a cloud computation part of the BLDC motor speed regulation control algorithm, and the dotted box portion of vehicle-mounted motor control is hardware parts of the BLDC motor speed regulation control algorithm module and power control, motor and sensors. Here, the dotted arrows represent wireless data transmission paths between the vehicle-mounted terminal and the cloud server over the high-speed wireless internet. Based on a difference between a given speed N and a motor speed feedback Nf, a given driving current ID is calculated by a torque calculation module. A difference between the given diving current ID and a motor feedback direct current IDf is inputted to a trigger angle and pulse width modulation module which computes to output a given trigger angle α and a given pulse width P. The given trigger angle α, the given pulse width P and pulse feedback signals a, b and c of the three-phase rotor magnetic pole positions are inputted to a cyclic coding and PWM computation module which performs cyclic coding and PWM computation to output three-phase PWM (which may alternatively output square waves only) voltage drive signals u, v and w. The voltage drive signals u, v and w are isolated and amplified by a gate driver, which in turn outputs upper bridge trigger signals HU, HV and HW and lower bridge trigger signals LU, LV and LW to drive a three-phase full bridge power inverter to output a three-phase alternating variable-frequency voltage which drives the motor to rotate. Alternatively, a two-phase or multi-phase alternating variable-frequency voltage may be used to drive the motor with a corresponding number of phases to rotate.

Based on the above embodiments, operations of the motor are controlled by the cloud motor controller 204 in combination with the vehicle-mounted motor sub-controller, and the complicated computation and process are moved to and performed in the cloud motor controller 204, which take the most of the powerful computing capability of the cloud motor controller 204, significantly simplify and reduce computing requirements of the vehicle-mounted motor sub-controller, thereby reducing costs of the vehicle-mounted motor control system. Conventionally, an expensive, high-speed 32-bit MCU or DSP chip system with floating-point function was generally required to perform the complicated computation for the motor and vehicle control. However, in implementing the solution of the present invention, the vehicle-mounted controller can be constructed based on an inexpensive 16-bit fixed point MCU, or even an 8-bit single-chip system.

The cloud controller may be connected to the vehicle-mounted communication terminals of a plurality of vehicles via a high-speed wireless internet, and exchanges information with a plurality of vehicle sub-controllers, respectively.

Collaborative computation (e.g. multivariable matrix algorithm) for the plurality of vehicles can be performed depending on types of the vehicles or regions where the vehicles are located, which can improve the computing speed and reliability.

The use of the cloud controller greatly reduces the costs of the controllers of the single vehicle, which directly reduces the cost of the whole vehicle. Moreover, the cloud motor controller 204 can control a plurality of vehicles simultaneously, which facilitates effective scheduling and unmanned driving of the plurality of vehicles.

The present invention aims to control a plurality of unmanned electric vehicles using the cloud computation. The complicated, rapid and big data computations (such as, precise navigation, motor inverse operation, potential safety hazard prediction and avoidance) are performed in the cloud side, and only the vehicle-mounted communication terminal 201, simple computing and execution mechanisms and sensors (e.g. systems with less amount of computation, such as, window lift, air conditioner, and/or seat adjuster systems) remain in the vehicle side, thereby achieving the coordinated motor control, planning and scheduling, orderly driving, hazard prediction and prevention, collaborative risk avoidance of multiple vehicles, while greatly reducing technical requirements, amount and costs of computing and control software and hardware at the vehicle.

In summary, the present invention discloses a system of controlling a plurality of unmanned electric vehicles to achieve precisely navigation, motor control and potential safety hazard prevention by using the cloud, and a control method thereof. The vehicle control system and control method are as follows: the vehicle-mounted communication terminal 201 collects identity information of the passenger and the vehicle, driving destination setting information, vehicle drive state information, relevant environment safety hazard information and state feedback information of the vehicle-mounted sub-controllers 200, 202 using the vehicle-mounted sub-controllers 200, 202 (motor controller, HMI, steering controller) and vehicle-mounted sensors (speed, vehicle location, motor rotor position, temperature inside and outside the vehicle, motor current, motor temperature, camera, radar), and they are sent to respective cloud sub-controllers 204, 205 (precise navigation, speed control, steering control, differential control, brake control, motor inverting control, etc.) through the cloud server 203. The cloud sub-controller 205 receives the passenger, vehicle, driving settings and vehicle condition information, and generates drive control instructions to the vehicle through an artificial intelligence cloud computation based on the passenger, vehicle, driving settings and vehicle condition information received from the vehicle side in combination with the relevant vehicle condition, road condition, weather, potential safety hazard big data information in the cloud side. The cloud motor controller 204 motor control information, and the drive control instructions and motor control information are sent to the vehicle-mounted communication terminal 201 through the cloud server 203. The vehicle-mounted communication terminal 201 sends the cloud control information and data to the respective vehicle-mounted sub-controllers to execute, and feeds back the driving setting information, vehicle and motor state information of the vehicle-mounted sub-controllers to the cloud server 203.

The technical solution of the present invention collects the vehicle information collected by the vehicle-mounted sub-controllers through the cloud server 203 and the vehicle-mounted communication terminal 201, and performs path plan, lane selection, turning and lane change, speed control, safety prediction, hazard avoidance, and main drive/steering motor control of the electric vehicle by taking the most of the powerful computing capability of the cloud sub-controllers, such that the vehicles drive regularly, predictively, preventively and orderly one after another, which significantly reduces accident rates, and improves traffic efficiency and safety. Moving operations of the complicated precise navigation, hazard prediction, multiple vehicle collaborative barrier avoidance, motor control computation and rapid processing to the cloud server 203 and the cloud sub-controllers also reduces the technical requirements and amount of the vehicle-mounted control devices, thereby reducing costs of the vehicle control system.

In the description and claims of the present application, each of the verbs "comprise", "include", "contain" and "have", and variations thereof, are used in an inclusive sense, to specify the presence of the stated item but not to exclude the presence of additional items.

It will be apparent to those skilled in the art that various modifications and variations can be made to the disclosed structure without departing from the scope or spirit of the invention. For example, in addition to the above-described inner rotor motor, the motor may also be an outer rotor motor, i.e. the rotor is disposed surrounding the stator; the stator core may be an integrated structure as described above as well as a separated structure, which are all within the scope of the present invention. In view of the foregoing, it is intended that the present invention cover modifications and variations of this invention provided they fall within the scope of the following claims and their equivalents.

The invention claimed is:

1. A vehicle control method using a cloud, comprising:
acquiring basic parameters of a cloud-controlled vehicle and a driver associated with the vehicle;
performing vehicle driving settings on a plurality of the cloud-controlled vehicles, wherein the vehicle driving settings include one or more settings of destination, high speed priority, shortest path, avoidance of congestion, vehicle speed and vehicle distance;
sending the vehicle driving settings to a cloud server;
sending a path planning instruction, a road selection instruction, a lane selection instruction, a vehicle speed instruction, a vehicle sequencing instruction, and a vehicle distance instruction through the cloud server to each vehicle according to the vehicle driving settings, a map system, weather information and road condition information;
controlling each vehicle to display and/or execute the path planning instruction, the road selection instruction, the lane selection instruction, the vehicle speed instruction, the vehicle sequencing instruction, and the vehicle distance instruction received from the cloud;
collecting vehicle state information in the process when the vehicle executes the instructions;
collecting motor state information in the process when the vehicle executes the instructions; and
computing in the cloud a motor drive signal for each vehicle according to the vehicle state information and the motor state information, the motor drive signal being used to drive the vehicle.

2. The vehicle control method according to claim 1, further comprising:
computing instructions of turning, a turning radius, braking, honking, steering, lighting and braking lamp of the vehicle according to the vehicle state information, environment information and potential safety hazard information.

3. The vehicle control method according to claim 2, further comprising: sending an avoidance instruction to all vehicles according to the potential safety hazard information, wherein the avoidance instruction includes at least one of a speed reduction instruction, a turning instruction and a braking instruction.

4. The vehicle control method according to claim 1, further comprising sending the basic parameters and the vehicle driving settings of the vehicle to the cloud server using high-speed wireless internet communication.

5. The vehicle control method according to claim 1, wherein computing in the cloud the motor drive signal comprises:
computing the motor drive signal with motor vector control or direct torque control algorithms according to the vehicle state information and the motor state information; and
controlling the vehicle to receive e motor drive signal, and driving a motor to rotate or brake according to the motor drive signal.

6. The vehicle control method according to claim 1, wherein the method comprises:
calculating, in the cloud, a motor torque given signal based on a difference between a speed given signal given by cloud computation and a motor speed feedback signal given by a motor sensor in the vehicle;
performing, in the cloud, a vector control algorithm or a direct torque control algorithm on the motor torque given signal in combination with a feedback signal given by a device mounted in the vehicle to obtain a voltage given signal,
performing, in the cloud, a Sinusoidal pulse width modulation conversion on the voltage given signal to obtain a voltage drive signal;
sending the voltage drive signal to the vehicle;
isolating and amplifying the voltage drive signal by a gate driver in the vehicle, the gate driver in turn outputting trigger signals to drive a power inverter to output an alternating variable-frequency voltage which drives a motor of the vehicle to rotate.

7. The vehicle control method according to claim 1, wherein the method comprises:
  calculating, in the cloud, a motor torque given signal based on a difference between a speed given signal given by cloud computation and a motor speed feedback signal given by a motor sensor in the vehicle;
  performing, in the cloud, a vector control algorithm or a direct torque control algorithm on the motor torque given signal in combination with a feedback signal given by a device mounted in the vehicle to obtain a voltage given signal;
  sending the voltage given signal to the vehicle
  performing, in the vehicle, a Sinusoidal pulse width modulation conversion on the voltage given signal to obtain a voltage drive signal;
  isolating and amplifying the voltage drive signal by a gate driver in the vehicle, the gate driver in turn outputting trigger signals to drive a power inverter to output an alternating variable-frequency voltage which drives a motor of the vehicle to rotate.

8. The vehicle control method according to claim 1, wherein the method comprises:
  calculating, in the cloud, a given driving current based on a difference between a given speed given by cloud computation and a motor speed feedback given by a motor sensor in the vehicle
  inputting a difference between the given diving current and a motor feedback direct current to a trigger angle and pulse width modulation module which computes to output a given trigger angle and a given pulse width, the trigger angle and pulse width modulation module being located in the cloud;
  sending the given trigger angle, the given pulse width to the vehicle;
  performing, in the vehicle, a cyclic coding and PWM computation on the given trigger angle, the given pulse width and pulse feedback signals of rotor magnetic pole positions to output a voltage drive signal;
  isolating and amplifying the voltage drive signal by a gate driver in the vehicle, the gate driver in turn outputting trigger signals to drive a power inverter to output an alternating variable-frequency voltage which drives a motor of the vehicle to rotate.

9. A vehicle control system for controlling a plurality of cloud-controlled vehicles, the vehicle control system comprising a cloud side and a cloud-controlled vehicle side; the cloud side including a cloud server, and a cloud drive controller and a cloud motor controller in communication with the cloud server; the cloud-controlled vehicle side including a vehicle-mounted communication terminal, and a vehicle-mounted sub-controller and a vehicle-mounted motor controller in communication with the vehicle-mounted communication terminal; the vehicle-mounted communication terminal being in communication with the cloud server;
  the vehicle-mounted sub-controller configured to acquire basic parameters of a driver and the vehicle;
  the vehicle-mounted sub-controller configured to perform vehicle driving settings, wherein the vehicle driving settings include settings of destination, high speed priority, shortest path, avoidance of congestion, vehicle speed and vehicle distance;
  the vehicle-mounted communication terminal configured to send the vehicle driving settings to the cloud server;
  the cloud drive controller configured to send, through the cloud server, at least one of a path planning instruction, a road selection instruction, a lane selection instruction, a vehicle speed instruction, a vehicle sequencing instruction, and a vehicle distance instruction to each vehicle according to the vehicle driving settings, a map and vehicle positioning system, weather information and road condition information;
  the vehicle-mounted sub-controller configured to display and control the vehicle to execute the path planning instruction, the road selection instruction, the lane selection instruction, the vehicle speed instruction, and the vehicle distance instruction;
  the vehicle-mounted sub-controller configured to collect vehicle state information in the process when the vehicle executes the instructions;
  the vehicle-mounted motor controller configured to collect motor state information in the process when the vehicle executes the instructions; and
  the cloud motor controller configured to compute a motor drive signal for each vehicle according to the vehicle state information and the motor state information, the motor drive signal being used for driving a vehicle motor.

10. The vehicle control system according to claim 9, wherein the cloud drive controller is configured to compute instructions of turning, a turning radius, braking, honking, steering, lighting and brake lamp of the vehicle according to the vehicle state information, environment information and potential safety hazard information.

11. The vehicle control system according to claim 9, wherein the cloud drive controller is configured to send an avoidance instruction to one corresponding vehicle according to the potential safety hazard information, wherein the avoidance instruction includes at least one of a speed reduction instruction, a turning instruction and a braking instruction.

12. The vehicle control system according to claim 9, wherein the cloud server is connected to the vehicle-mounted communication terminal through a high-speed wireless internet communication.

13. The vehicle control system according to claim 9, wherein the cloud motor controller is configured to compute the motor drive signal with motor vector control algorithm or direct torque control algorithm according to the vehicle state information and the motor state information, and send the motor drive signal to the vehicle-mounted communication terminal through the cloud server; and the vehicle-mounted motor controller is configured to receive the motor drive signal from the vehicle-mounted communication terminal, and drive the vehicle motor to rotate or brake according to the motor drive signal.

14. A vehicle control method configured to be performed in one of a plurality of cloud-controlled vehicles, comprising:
  acquiring basic parameters of the one vehicle and a driver associated with the one vehicle;
  acquiring vehicle driving settings associated with the one vehicle, wherein the vehicle driving settings include at least one of settings of destination, high speed priority, shortest path, avoidance of congestion, vehicle speed and vehicle distance;
  sending the vehicle driving settings to a cloud server in a cloud;
  receiving a vehicle control instruction for the one vehicle from the cloud server, the vehicle control instruction being an instruction that is calculated in the cloud according to the vehicle driving settings and other cloud data, the vehicle control instruction including at least one of a path planning instruction, a road selection instruction, a lane selection instruction, a vehicle speed instruction, a vehicle sequencing instruction, and a vehicle distance instruction, the other cloud data including at least one of map system data, weather information and road condition information;

controlling the one vehicle to display and/or execute the vehicle control instruction;

collecting vehicle state information in the process when the one vehicle executes the vehicle control instruction, and sending the vehicle state information to the cloud server;

collecting motor state information in the process when the one vehicle executes the vehicle control instruction, and sending the motor state information to the cloud server;

receiving a motor drive signal for the one vehicle from the cloud server, the motor drive signal being a signal that is calculated in the cloud according to the vehicle state information and the motor state information; and driving the vehicle using the motor drive signal.

* * * * *